United States Patent
Nagatsu et al.

(10) Patent No.: US 9,874,169 B2
(45) Date of Patent: Jan. 23, 2018

(54) CONTROL DEVICE OF COMPRESSION-IGNITION ENGINE

(71) Applicant: Mazda Motor Corporation, Aki-gun, Hiroshima (JP)

(72) Inventors: Kazuhiro Nagatsu, Hiroshima (JP); Junichi Taga, Higashihiroshima (JP); Atsushi Inoue, Aki-gun (JP); Takashi Youso, Hiroshima (JP); Mitsunori Wasada, Hiroshima (JP); Keiji Araki, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 402 days.

(21) Appl. No.: 14/464,581

(22) Filed: Aug. 20, 2014

(65) Prior Publication Data

US 2015/0083073 A1 Mar. 26, 2015

(30) Foreign Application Priority Data

Sep. 25, 2013 (JP) ................................. 2013-198272

(51) Int. Cl.
*F02D 41/12* (2006.01)
*F02D 13/02* (2006.01)
(Continued)

(52) U.S. Cl.
CPC .............. *F02D 41/123* (2013.01); *F02B 1/14* (2013.01); *F02D 35/025* (2013.01);
(Continued)

(58) Field of Classification Search
CPC .... F02D 41/123; F02D 41/126; F02D 35/025; F02D 41/3076; F02D 41/3035;
(Continued)

(56) References Cited

U.S. PATENT DOCUMENTS

| 6,276,334 B1 | 8/2001 | Flynn et al. |
| 6,772,742 B2 * | 8/2004 | Lei .......................... F02M 26/01 123/568.14 |

(Continued)

FOREIGN PATENT DOCUMENTS

| EP | 1298292 A2 | 4/2003 |
| JP | H09303144 A | 11/1997 |

(Continued)

OTHER PUBLICATIONS

Japanese Patent Office, Office Action Issued in Application No. 2013198272, dated Mar. 21, 2017, 3 pages.

*Primary Examiner* — David Hamaoui
(74) *Attorney, Agent, or Firm* — Alleman Hall Creasman & Tuttle LLP

(57) ABSTRACT

A control device of a compression-ignition engine is provided. The device includes an engine having a cylinder, a fuel injection valve for injecting a fuel, an exhaust valve mechanism for switching an operation mode of an exhaust valve between a normal mode and an open-twice mode, a throttle valve disposed on an intake passage, and a controller for operating the engine by compression-ignition combustion of mixture gas inside the cylinder at least within a low engine load range. The controller suspends the fuel injection by the fuel injection valve when a predetermined fuel cut condition is met while the engine decelerates, and the controller fully closes the throttle valve and controls the exhaust valve mechanism to operate in the open-twice mode during the fuel cut. When a predetermined fuel resuming condition is met, the controller restarts the fuel injection, opens the throttle valve, and causes the compression-ignition combustion.

13 Claims, 10 Drawing Sheets

(51) Int. Cl.

| | | |
|---|---|---|
| *F02B 1/14* | (2006.01) | |
| *F02D 41/00* | (2006.01) | |
| *F02D 41/14* | (2006.01) | |
| *F02D 41/30* | (2006.01) | |
| *F02D 35/02* | (2006.01) | |
| *F02D 41/40* | (2006.01) | |
| *F02M 25/12* | (2006.01) | |
| *F02M 26/25* | (2016.01) | |

(52) U.S. Cl.
  CPC ..... *F02D 41/0025* (2013.01); *F02D 41/0077* (2013.01); *F02D 41/126* (2013.01); *F02D 41/1438* (2013.01); *F02D 41/3005* (2013.01); *F02D 41/3035* (2013.01); *F02D 41/3076* (2013.01); *F02D 13/0261* (2013.01); *F02D 41/0005* (2013.01); *F02D 41/006* (2013.01); *F02D 41/0057* (2013.01); *F02D 41/401* (2013.01); *F02D 2041/001* (2013.01); *F02M 25/12* (2013.01); *F02M 26/25* (2016.02); *Y02T 10/128* (2013.01)

(58) Field of Classification Search
  CPC ............. F02D 41/0025; F02D 41/1438; F02D 41/0077; F02D 41/3005; F02D 2041/001; F02D 41/0005; F02D 41/0057; F02D 41/401; F02D 13/0261; F02D 41/006; F02B 1/14; F02M 26/25; F02M 25/12; Y02T 10/128
  See application file for complete search history.

(56) References Cited

U.S. PATENT DOCUMENTS

| | | | | |
|---|---|---|---|---|
| 6,807,956 B2 * | 10/2004 | Gaessler | ............ | F02D 13/0207 123/568.14 |
| 7,121,233 B2 | 10/2006 | Kitamura et al. | | |
| 7,204,214 B2 * | 4/2007 | Miyaji | ................. | F01L 1/047 123/90.15 |
| 7,349,791 B2 * | 3/2008 | Nishikiori | ........... | F02D 13/0261 123/568.14 |
| 7,500,475 B2 * | 3/2009 | Raymond | ........... | F02D 13/0207 123/316 |
| 7,712,449 B1 * | 5/2010 | Schwoerer | ................ | F01L 1/08 123/321 |
| 8,191,353 B2 * | 6/2012 | Kakinohana | ............ | F01N 3/021 60/274 |
| 8,229,652 B2 * | 7/2012 | Natsui | ................... | F02B 23/101 123/90.15 |
| 9,334,784 B2 * | 5/2016 | Nishimura | ............. | F01N 9/002 |
| 2003/0061803 A1 | 4/2003 | Iihoshi et al. | | |
| 2003/0192305 A1 | 10/2003 | Iihoshi et al. | | |
| 2005/0224045 A1 | 10/2005 | Kuzuyama | | |
| 2008/0041339 A1 | 2/2008 | Nishikiori et al. | | |
| 2012/0216776 A1 * | 8/2012 | Nagatsu | ............. | F02D 13/0234 123/305 |
| 2013/0167508 A1 | 7/2013 | Nishimura | | |
| 2014/0074378 A1 * | 3/2014 | Iwai | ........................ | F02D 43/04 701/104 |
| 2014/0283784 A1 * | 9/2014 | Takahashi | ........... | F02D 41/3011 123/350 |
| 2014/0283785 A1 * | 9/2014 | Takahashi | ........... | F02D 41/3011 123/350 |
| 2015/0114342 A1 * | 4/2015 | Iwai | ........................ | F02P 15/08 123/305 |
| 2016/0265482 A1 * | 9/2016 | Nagatsu | ................. | F02M 25/12 |

FOREIGN PATENT DOCUMENTS

| | | | |
|---|---|---|---|
| JP | H10205397 A | 8/1998 | |
| JP | 4159918 B2 | 10/2008 | |
| JP | 2012172665 A | 9/2012 | |
| JP | 2015194110 A * | 11/2015 | ............. F02B 11/00 |
| WO | 2012058280 A2 | 5/2012 | |

* cited by examiner

CONTROL DEVICE OF COMPRESSION-IGNITION ENGINE

BACKGROUND

The present invention relates to a control device of a compression-ignition engine.

For example, JP2012-172665A discloses an engine which performs compression-ignition combustion of mixture gas within a cylinder when an operating state of the engine is within an operating range where an engine load is lower than a predetermined switching load, and which performs combustion by forcibly igniting the mixture gas within the cylinder with an ignition plug when the operating state of the engine is within an operating range where the engine load is higher than the switching load. With this engine, when performing the compression-ignition combustion, an exhaust valve is opened on exhaust stroke and also on intake stroke to introduce, into the cylinder, a part of exhaust gas discharged to the exhaust side, i.e., a so-called exhaust open-twice control is performed. The introduction of internal EGR gas by the exhaust open-twice control increases a compression-end temperature to improve ignitability in compression ignition and combustion stability.

Also, JP4159918B discloses an engine which performs, similarly to the engine in JP2012-172665A, the compression-ignition combustion within the low engine load range, and performs the spark-ignition combustion within the high engine load range. The engine is also configured to perform a fuel cut while decelerating, and when resuming from the fuel cut, even within the operating range to perform the compression-ignition combustion, the engine performs the spark-ignition combustion for a predetermined period of time, and then performs the compression-ignition combustion. In other words, since the temperature inside the cylinder becomes low during the fuel cut and the compression-ignition combustion cannot be performed stably when resuming from the fuel cut, the spark-ignition combustion is performed for the predetermined time period to secure the combustion stability and increase the temperature inside the cylinder.

As disclosed in JP4159918B, performing the spark-ignition combustion when resuming from the fuel cut is effective in view of the combustion stability; however, it causes degradation in exhaust emission performance and fuel consumption.

SUMMARY

The present invention is made in view of the above situations and aims to enable, when resuming from a fuel cut, a compression-ignition engine which performs compression-ignition combustion at least within a low engine load range, to resume by the compression-ignition combustion.

According to one aspect to the present invention, a control device of a compression-ignition engine is provided. The control device includes an engine having a cylinder, a fuel injection valve for injecting a fuel to be supplied into the cylinder, an exhaust valve mechanism for switching an operation mode of an exhaust valve of the engine between a normal mode in which the exhaust valve is opened on exhaust stroke, and an open-twice mode in which the exhaust valve is opened on the exhaust stroke and intake stroke to introduce a part of exhaust gas into the cylinder, a throttle valve disposed on an intake passage connecting with the cylinder, and a controller for operating the engine by compression-ignition combustion of mixture gas inside the cylinder at least when an operating state of the engine is within a low engine load range.

The controller suspends the fuel injection by the fuel injection valve when a predetermined fuel cut condition is met while the engine decelerates, and the controller fully closes the throttle valve and controls the exhaust valve mechanism to operate in the open-twice mode during the fuel cut. When a predetermined fuel resuming condition is met, the controller restarts the fuel injection by the fuel injection valve, opens the throttle valve, and causes the compression-ignition combustion of the mixture gas inside the cylinder.

According to this configuration, at least within the low engine load range, the engine is operated by the compression-ignition combustion of the mixture gas inside the cylinder. Thus, both exhaust emission performance and thermal efficiency improve.

When the predetermined fuel cut condition is met while the engine decelerates, the fuel injection by the fuel injection valve is suspended. The fuel cut during the deceleration is effective at improving fuel consumption. Further, with this configuration, during the fuel cut, the throttle valve is fully closed and the exhaust valve mechanism operates in the open-twice mode. By fully closing the throttle valve, an introduction of fresh air with comparatively low temperature into the cylinder is suppressed. Moreover, by causing the exhaust valve mechanism to operate in the open-twice mode, the part of the gas inside the cylinder discharged to the exhaust side on the exhaust stroke is introduced into the cylinder again due to the exhaust valve being opened on the intake stroke. Thus, in combination of the fully closed throttle valve with the suppression of the introduction of fresh air into the cylinder during the fuel cut, it is suppressed that fresh air with comparatively low temperature passes through the cylinder from the intake side to the exhaust side. Moreover, by the exhaust open-twice control, high-temperature burned gas existing inside the cylinder remains within the cylinder as much as possible before the fuel cut starts. Thus, the decrease in a temperature inside the cylinder during the fuel cut is suppressed.

As a result, since the temperature inside the cylinder is comparatively high when the fuel resuming condition is met and the fuel injection by the fuel injection valve is restarted, stable compression-ignition combustion of the mixture gas is achieved. Specifically, when resuming from the fuel cut, in the case where the engine operating state is within the range where the compression-ignition combustion is performed, the fuel supply can be resumed by the compression-ignition combustion instead of performing spark-ignition combustion, and the exhaust emission performance and the fuel consumption can be improved.

The control device may also include an ozone introducer for introducing ozone into the cylinder. The controller may introduce ozone into the cylinder by the ozone introducer when restarting the fuel injection by the fuel injection valve.

By introducing ozone into the cylinder when resuming from the fuel cut, the ignitability in the compression ignition improves, as well as the stability of the compression-ignition combustion. With the combination of the suppression of the temperature decrease inside the cylinder during the fuel cut and the introduction of ozone, the compression-ignition combustion can be performed more stably when resuming from the fuel cut.

The controller may introduce ozone into the cylinder by the ozone introducer when a temperature inside the cylinder becomes lower than a predetermined temperature during the fuel cut.

The introduction of ozone is not necessary in a case where the temperature inside the cylinder can be kept high by fully closing the throttle valve and opening/closing the exhaust valve in the open-twice mode, and the compression-ignition combustion can be performed stably when resuming from the fuel cut. In this case, it becomes advantageous for improving the fuel consumption when ozone is not introduced.

On the other hand, ozone is introduced into the cylinder by the ozone introducer in a case where the temperature inside the cylinder is decreased due to, for example, a long duration time of the fuel cut even though the throttle valve and the exhaust valve are controlled to suppress the temperature decrease inside the cylinder during the fuel cut. Thus, the resuming from the fuel cut can be performed by the compression-ignition combustion.

The ozone introducer may be disposed on the intake passage and apply ozone to air in the intake passage. The controller may start applying ozone to air in the intake passage by the ozone introducer during the fuel cut.

Since generated ozone evaporates when exceeding a predetermined temperature, for example, if ozone is introduced into the cylinder during the fuel cut, the temperature thereof increases due to compression of the gas inside the cylinder by the motoring, and the ozone may evaporate.

With the configuration in which the ozone introducer is disposed on the intake passage and ozone is applied to air in the intake passage, the ozone in the intake passage does not evaporate during the fuel cut. As a result, when resuming from the fuel cut, the ozone in the intake passage can be introduced into the cylinder and the stability of the compression-ignition combustion can be improved.

The controller may set a timing to start applying ozone by the ozone introducer based on at least one of a temperature inside the cylinder and a duration time of the fuel cut.

The introduction of ozone is not necessary in the case where the compression-ignition combustion can be performed stably when resuming from the fuel cut, by suppressing the temperature decrease inside the cylinder as described above. Thus, setting the timing to start applying ozone by the ozone introducer based on at least one of the temperature inside the cylinder and the duration time of the fuel cut is advantageous for improving the fuel consumption.

Here, with the configuration in which ozone is applied to air in the intake passage, since ozone is not compressed inside the cylinder and does not evaporate as described above, an ozone concentration within the intake passage gradually increases during the fuel cut. This enables the introduction of a sufficient amount of ozone into the cylinder when resuming from the fuel cut, which is advantageous for improving the stability of the compression-ignition combustion.

The control device may also include an intake valve mechanism for changing a close timing of an intake valve of the engine. During the fuel cut, the controller may set the close timing of the intake valve to a late close timing that is after an intake bottom dead center by a predetermined crank angle so that an effective compression ratio decreases, and when the predetermined fuel resuming condition is met and the fuel injection by the fuel injection valve is restarted, the controller may advance the close timing of the intake valve from the late close timing.

As described above, if ozone is introduced into the cylinder during the fuel cut, the temperature thereof increases due to compression of the gas inside the cylinder, and the ozone may evaporate. Therefore, during the fuel cut, the close timing of the intake valve is set to the late close timing that is after the intake bottom dead center. Thus, during the fuel cut, the effective compression ratio is reduced and, therefore, the temperature increase inside the cylinder by the motoring is suppressed and the evaporation of ozone introduced into the cylinder is suppressed, which is advantageous for improving the stability of the compression-ignition combustion when resuming from the fuel cut.

Moreover, when resuming from the fuel cut, the close timing of the intake valve is advanced from the late close timing. Thus, the effective compression ratio is increased and a compression-end temperature and a compression-end pressure increase, which is advantageous for improving the stability of the compression-ignition combustion when resuming from the fuel cut and after the resuming. Note that when resuming from the fuel cut, it is preferred that the exhaust valve is operated in the open-twice mode, and in this manner, the high-temperature burned gas can be introduced into the cylinder, and the temperature inside the cylinder is increased to improve the stability of the compression-ignition combustion.

The temperature inside the cylinder may be at a gas temperature within the cylinder at a compression top dead center, and the temperature inside the cylinder may be estimated based on at least a duration time of the fuel cut or directly by a sensor.

According to another aspect of the present invention, a control device of a compression-ignition engine is provided. The control device includes an engine having a cylinder, a fuel injection valve for injecting a fuel to be supplied into the cylinder, an exhaust valve mechanism for switching between a normal mode in which an exhaust valve of the engine is opened on exhaust stroke, and an open-twice mode in which the exhaust valve is opened on the exhaust stroke and intake stroke to introduce a part of exhaust gas into the cylinder, a throttle valve disposed on a intake passage connecting with the cylinder, an ozone introducer disposed on the intake passage and for applying ozone to air in the intake passage, and a controller for operating the engine by compression-ignition combustion of mixture gas inside the cylinder at least when an operating state of the engine is within a low engine load range on a low engine load side.

When a predetermined fuel cut condition is met while the engine decelerates, the controller suspends the fuel injection by the fuel injection valve, and during the fuel cut, the controller fully closes the throttle valve, controls the exhaust valve mechanism to operate in the open-twice mode, and applies ozone to air in the intake passage by the ozone introducer.

According to this configuration, as described above, during the fuel cut after the fuel cut condition is met and the fuel injection is suspended, by fully closing the throttle valve and the open-twice control of the exhaust valve, the temperature decrease inside the cylinder is suppressed. Moreover, during the fuel cut, by applying ozone to air in the intake passage, the ozone concentration within the intake passage can be increased. As a result, when resuming from the fuel cut, although the engine operating state is within the low engine load range where the compression-ignition combustion is performed, since the temperature inside the cylinder is comparatively high and ozone in the intake passage is introduced into the cylinder, the compression-ignition combustion of the mixture gas formed within the cylinder can be performed stably.

DETAILED DESCRIPTION OF EMBODIMENT

Figure 1:
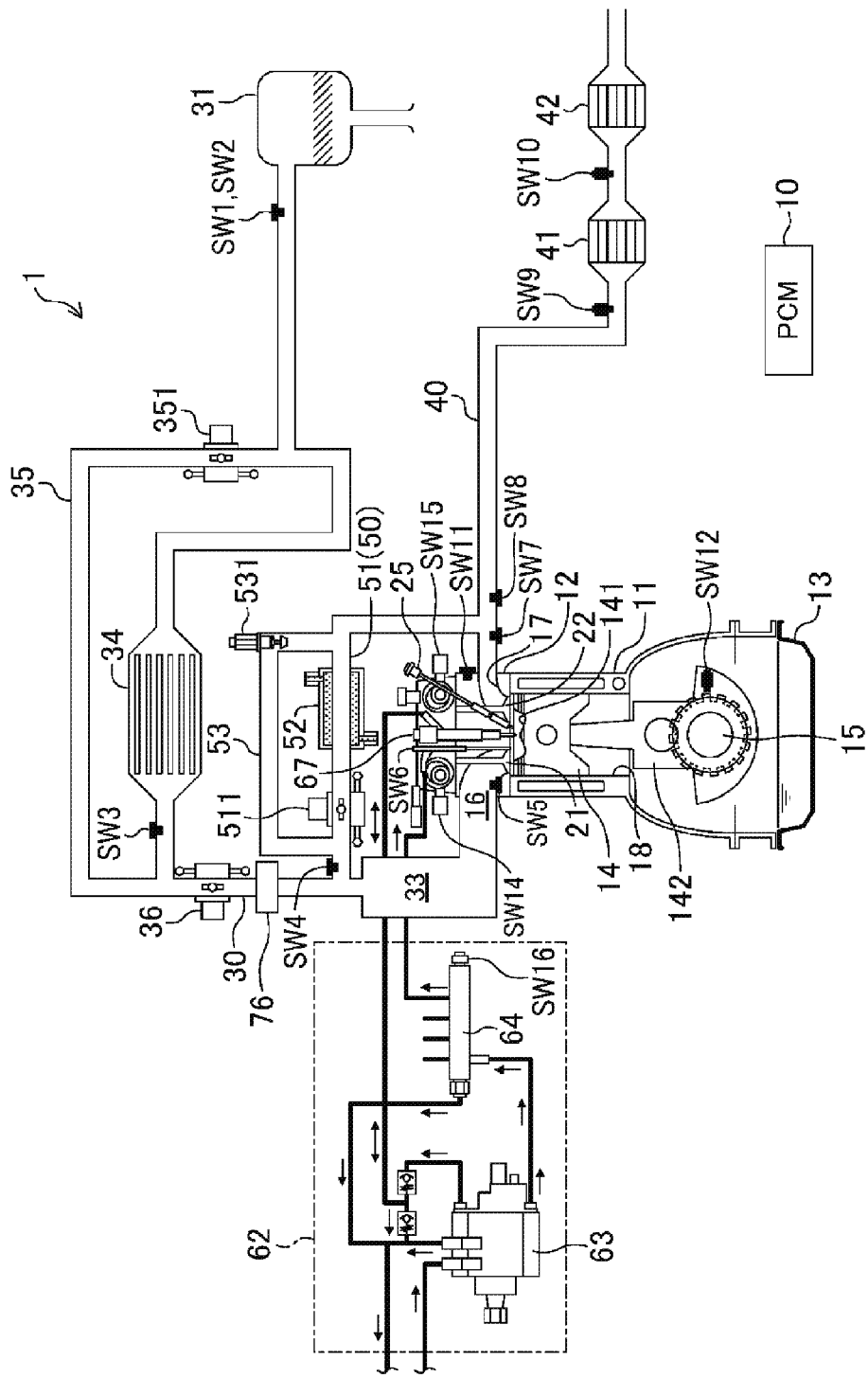
FIG. 1 is a schematic diagram illustrating a configuration of a compression-ignition engine.
Figure 2:
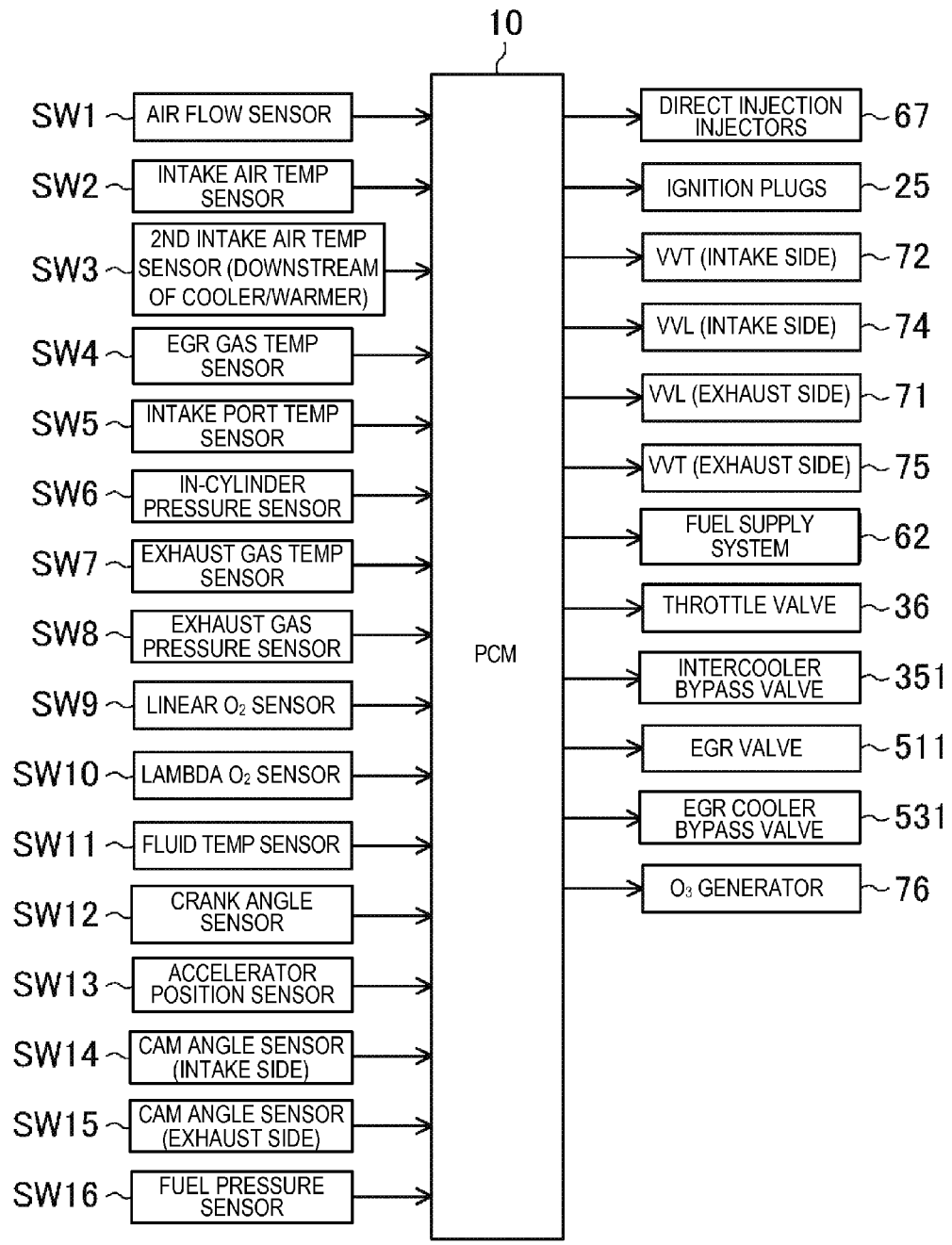
FIG. 2 is a block diagram relating to a control of the compression-ignition engine.
Figure 3:
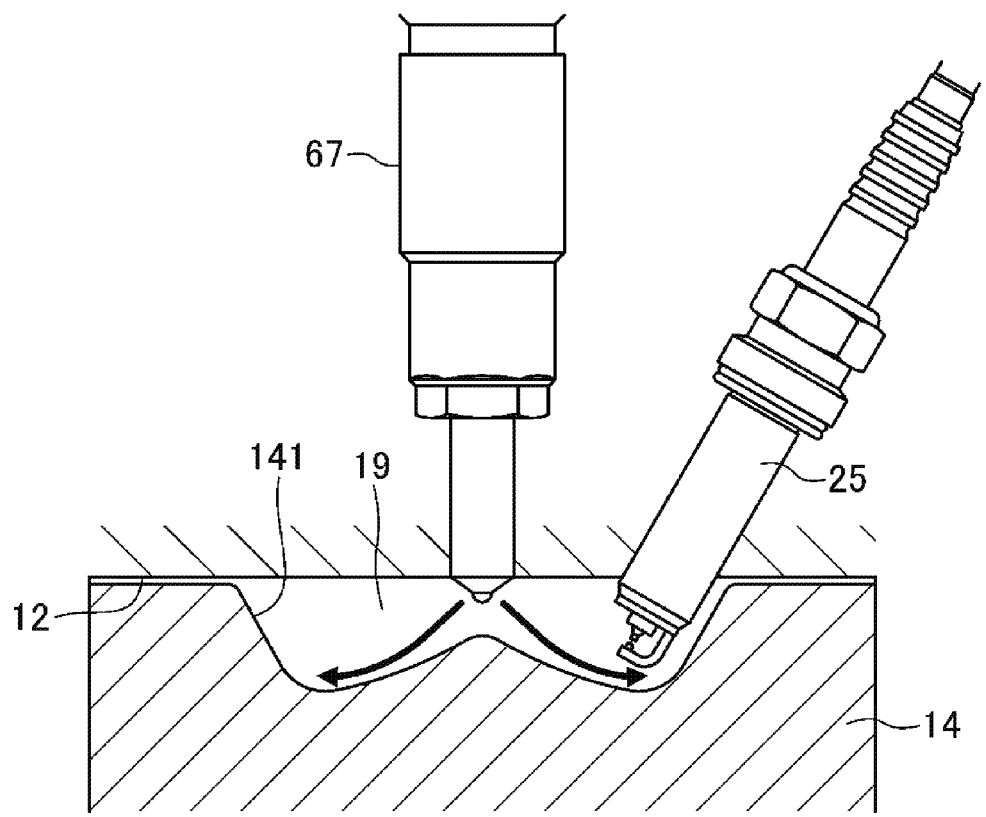
FIG. 3 is a cross-sectional view illustrating a combustion chamber in an enlarged manner.

Hereinafter, a control device of a compression-ignition engine according to one embodiment of the present invention is described in detail with reference to the appended drawings. The following description of the preferred embodiment is an illustration. FIGS. 1 and 2 illustrate a schematic configuration of an engine 1 (engine body) of this embodiment. The engine 1 is a compression-ignition gasoline engine that is equipped in a vehicle and supplied with fuel containing at least gasoline. The engine 1 includes a cylinder block 11 provided with a plurality of cylinders 18 (note that although only one cylinder is illustrated in FIG. 1, for example, four cylinders are linearly provided in this embodiment), a cylinder head 12 disposed on the cylinder block 11, and an oil pan 13 disposed below the cylinder block 11, where a lubricant is stored. Reciprocatable pistons 14 coupled to a crankshaft 15 via respective connecting rods 142 are fitted inside the cylinders 18. As illustrated in FIG. 3 in an enlarged manner, a cavity 141 having a reentrant shape, such as the shape generally used in a diesel engine, is formed on a top face of each piston 14. When the piston 14 is at a position near a compression top dead center (CTDC), the cavity 141 faces toward an injector 67 described later. The cylinder head 12, the cylinders 18, and the pistons 14 each formed with the cavity 141 partition combustion chambers 19. Note that the shape of the combustion chamber 19 is not limited to the shape in the drawings. For example, the shape of the cavity 141, the shape of the top face of the piston 14, and the shape of a ceiling part of the combustion chamber 19 may suitably be changed.

A geometric compression ratio of the engine 1 is set comparatively high at 15:1 or higher so as to improve theoretical thermal efficiency and stabilize compression-ignition combustion (described later). Note that the geometric compression ratio may suitably be set within a range between about 15:1 and 20:1.

In the cylinder head 12, each of the cylinders 18 is formed with an intake port 16 and an exhaust port 17, and provided with an intake valve 21 for opening and closing the intake port 16 on the combustion chamber 19 side and an exhaust valve 22 for opening and closing the exhaust port 17 on the combustion chamber 19 side.

Figure 5:
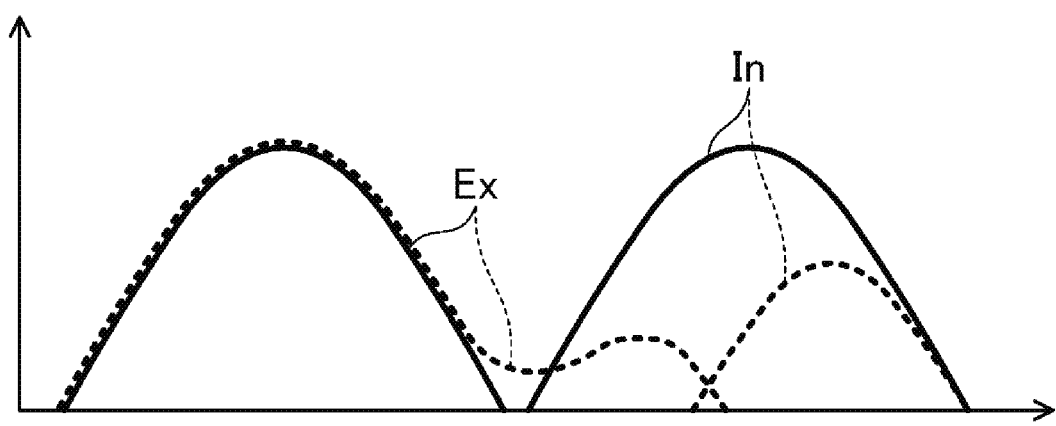
FIG. 5 illustrates a lift curve of an intake valve switchable between a large lift and a small lift, and a lift curve of an exhaust valve switchable between a normal open operation and a special operation in which the valve opens again on intake stroke.

In a valve train system of the engine 1 for operating the intake and exhaust valves 21 and 22, for example, a hydraulically-actuated variable valve mechanism 71 (see FIG. 2, hereinafter, may be referred to as the VVL (Variable Valve Lift)) for switching an operation mode of the exhaust valve 22 between a normal mode and a special mode, and a phase variable mechanism 75 (hereinafter, may be referred as the VVT (Variable Valve Timing)) for changing a rotational phase of an exhaust camshaft with respect to the crankshaft 15, are provided on an exhaust side. The VVL 71 (the detailed configuration is not illustrated) includes two kinds of cams with different cam profiles in which a first cam has one cam nose and a second cam has two cam noses; and a lost motion mechanism for selectively transmitting an operating state of either one of the first and second cams to the exhaust valve 22. While the lost motion mechanism transmits the operating state of the first cam to the exhaust valve 22, as indicated by the solid line in FIG. 5, the exhaust valve 22 operates in the normal mode where it opens only once during exhaust stroke. On the other hand, while the lost motion mechanism transmits the operating state of the second cam to the exhaust valve 22, as indicated by the dashed line in FIG. 5, the exhaust valve 22 operates in the special mode, which is a so-called exhaust open-twice control, where it opens once during the exhaust stroke and once more during an intake stroke. The normal and special modes of the VVL 71 are switched therebetween according to an operating state of the engine. Specifically, the special mode is utilized for a control related to an internal EGR. Hereinafter, the processing of operating the VVL 71 in the normal mode where the exhaust open-twice control is not performed may be referred to as "turning the VVL 71 off," and the processing of operating the VVL 71 in the special mode where the exhaust open-twice control is performed may be referred to as "turning the VVL 71 on." Note that in enabling the switch between the normal mode and the special mode, an electromagnetic valve train system for operating the exhaust valve 22 by an electromagnetic actuator may be adopted.

Note that the execution of the internal EGR is not limited to be achieved by the exhaust open-twice control only. For example, the internal EGR control may be performed by an intake open-twice control in which the intake valve 21 opens twice, and an internal EGR control may be performed in which burned gas remains inside the cylinder 18 by providing a negative overlap period in which both the intake and exhaust valves 21 and 22 are closed on the exhaust stroke or the intake stroke. Note that as described later, the exhaust open-twice control is most preferable for increasing the compression-end temperature.

For the VVT 75, a known structure of any one of a hydraulic type, an electromagnetic type, and a mechanical type may suitably be adopted, and detailed structure thereof is not illustrated. Open and close timings of the exhaust valve 22 can be changed continuously by the VVT 75 within a predetermined range.

Similarly to the exhaust side of the valve train system including the VVL 71 and the VVT 75, an intake side of the valve train system includes a VVL 74 and a VVT 72 as illustrated in FIG. 2. The VVL 74 on the intake side is different from the VVL 71 on the exhaust side. The VVL 74 on the intake side includes two kinds of cams with different cam profiles in which a large lift cam relatively increases the lift of the intake valve 21 and a small lift cam relatively reduces the lift of the intake valve 21; and a lost motion mechanism for selectively transmitting an operating state of either one of the large and small lift cams to the intake valve 21. While the VVL 74 transmits the operating state of the large lift cam to the intake valve 21, as indicated by the solid line in FIG. 5, the intake valve 21 opens with a relatively large lift, and an open period thereof is long. On the other hand, while the VVL 74 transmits the operating state of the small lift cam to the intake valve 21, as indicated by the dashed line in FIG. 5, the intake valve 21 opens with a relatively small lift, and the open period thereof is short. The large lift cam and the small lift cam are set to be switched, for example, by having the open timings thereof the same.

Also for the VVT 72 on the intake side, similarly to the VVT 75 on the exhaust side, a known structure of any one of a hydraulic type, an electromagnetic type, and a mechanical type may suitably be adopted, and detailed structure thereof is not illustrated. Open and close timings of the intake valve 21 can also be changed continuously by the VVT 72 within a predetermined range.

For each cylinder 18, the (direct injection) injector 67 for directly injecting the fuel into the cylinder 18 is attached to the cylinder head 12. As illustrated in an enlarged manner in FIG. 3, a nozzle hole of the injector 67 is arranged in a center portion of the ceiling face of the combustion chamber 19 to be oriented toward the inside of the combustion chamber 19. The injector 67 directly injects the fuel into the combustion chamber 19 by an amount according to the operating state of the engine 1 at an injection timing set according to the operating state of the engine 1. In this embodiment, the injector 67 (a detailed configuration is not illustrated) is a multi-hole injector formed with a plurality of nozzle holes. Thus, the injector 67 injects the fuel so that the fuel spray spreads radially from the center portion of the combustion chamber 19. As indicated by the arrows in FIG. 3, at a timing when the piston 14 reaches near the CTDC, the fuel spray injected to spread radially from the center portion of the combustion chamber 19 flows along a wall surface of the cavity 141 formed on the piston top face. Therefore, it may be said that the cavity 141 is formed to contain therewithin the fuel spray injected at the timing when the piston 14 reaches near the CTDC. The combination of the multi-hole injector 67 and the cavity 141 is advantageous for, after the fuel is injected, shortening a mixture gas forming period and the combustion period. Note that the injector 67 is not limited to the multi-hole injector, and may be an outward opening valve type injector.

A fuel supply path couples a fuel tank (not illustrated) to the injectors 67. A fuel supply system 62 for supplying the fuel to each of the injectors 67 at a comparatively high fuel pressure and having a fuel pump 63 and a common rail 64 is provided within the fuel supply path. The fuel pump 63 pumps the fuel from the fuel tank to the common rail 64, and the common rail 64 can accumulate the pumped fuel at a comparatively high fuel pressure. By opening the nozzle holes of the injector 67, the fuel accumulated in the common rail 64 is injected from the nozzle holes of the injector 67. Here, the fuel pump 63 is a plunger type pump (not illustrated) and is operated by the engine 1. The fuel supply system 62 including the engine-operated pump enables the supply of the fuel to the injector 67 at a high fuel pressure of 30 MPa or higher. The fuel pressure may be set to about 120 MPa at the highest. As described later, the pressure of the fuel supplied to the injector 67 is changed according to the operating state of the engine 1. Note that the fuel supply system 62 is not limited to the above configuration.

Further, as illustrated in FIG. 3, an ignition plug 25 for forcibly igniting mixture gas inside the combustion chamber 19 is attached to the cylinder head 12 for each cylinder 18. In this embodiment, the ignition plug 25 is arranged penetrating the cylinder head 12 so as to extend obliquely downward from the exhaust side of the engine 1. As illustrated in FIG. 3, a tip of the ignition plug 25 is oriented toward the inside of the cavity 141 of the piston 14 at the CTDC.

On one side surface of the engine 1, as illustrated in FIG. 1, an intake passage 30 is connected to communicate with the intake port 16 of each cylinder 18. On the other side surface of the engine 1, an exhaust passage 40 is connected to guide out the burned gas (exhaust gas) discharged from each of the combustion chambers 19 of the cylinders 18.

An air cleaner 31 for filtrating intake air is disposed in an upstream end part of the intake passage 30. A surge tank 33 is disposed near a downstream end of the intake passage 30. A part of the intake passage 30 downstream of the surge tank 33 is branched to be independent passages extending toward the respective cylinders 18, and downstream ends of the independent passages are connected with the intake ports 16 of the cylinders 18, respectively.

A water-cooled type intercooler/warmer 34 for cooling or heating air and a throttle valve 36 for adjusting an intake air amount to each cylinder 18 are disposed between the air cleaner 31 and the surge tank 33 in the intake passage 30. Moreover, an intercooler bypass passage 35 for bypassing the intercooler/warmer 34 is connected to the intake passage 30, and an intercooler bypass valve 351 for adjusting an air flow rate passing through the passage 35 is disposed within the intercooler bypass passage 35. A ratio of a flow rate within the intercooler bypass passage 35 with a flow rate within the intercooler/warmer 34 is adjusted through controlling an opening of the intercooler bypass valve 351, and thus, a temperature of fresh air introduced into the cylinder 18 can be adjusted. Note that the intercooler/warmer 34 and the members in connection therewith may be omitted.

An upstream part of the exhaust passage 40 includes an exhaust manifold. The exhaust manifold has independent passages branched toward the respective cylinders 18 and connected with respective external ends of the exhaust ports 17, and a manifold section where the independent passages merge together. In a part of the exhaust passage 40 on the downstream side of the exhaust manifold, a direct catalyst 41 and an underfoot catalyst 42 are connected as an exhaust emission control system for purifying hazardous components contained in the exhaust gas. Each of the direct catalyst 41 and the underfoot catalyst 42 includes a cylindrical case and, for example, a three-way catalyst disposed in a flow path within the case.

A part of the intake passage 30 between the surge tank 33 and the throttle valve 36 is connected with a part of the exhaust passage 40 on the upstream side of the direct catalyst 41 via an EGR passage 50 for circulating a part of the exhaust gas back to the intake passage 30. The EGR passage 50 includes a main passage 51 provided with an EGR cooler 52 for cooling the exhaust gas by an engine coolant, and an EGR cooler bypass passage 53 for bypassing the EGR cooler 52. An EGR valve 511 for adjusting a circulation amount of the exhaust gas to the intake passage 30 is disposed within the main passage 51. An EGR cooler bypass valve 531 for adjusting a flow rate of the exhaust gas flowing through the EGR cooler bypass passage 53 is disposed within the EGR cooler bypass passage 53.

Figure 4:
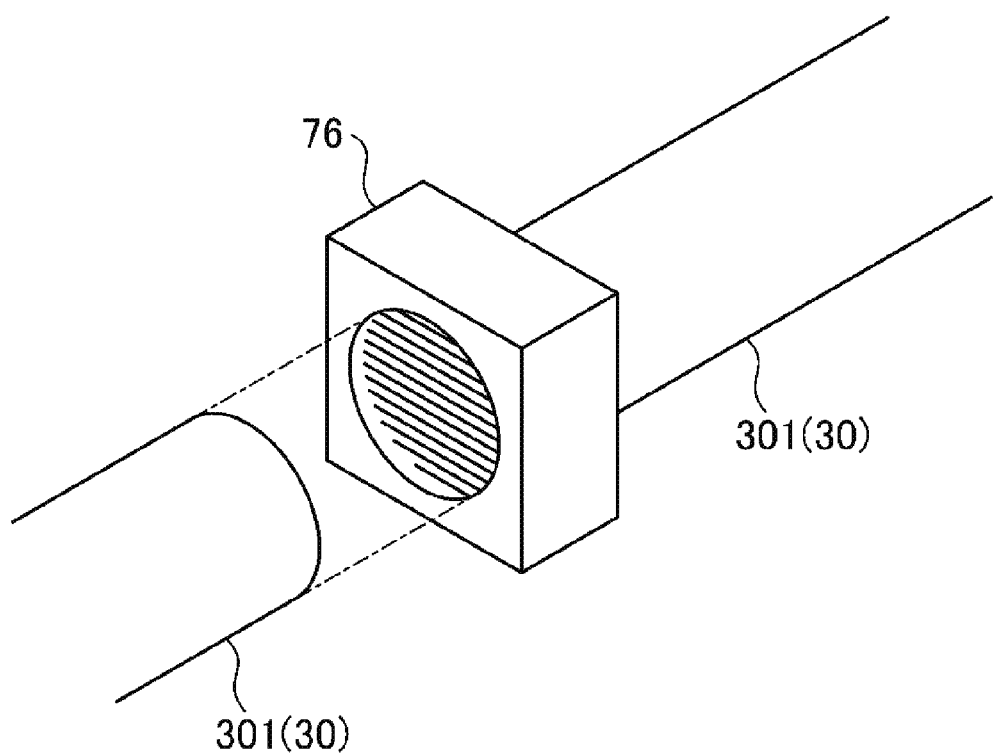
FIG. 4 is a conceptual view illustrating a configuration of an ozone generator.

Moreover, an ozone generator ($O_3$ generator) 76 for applying ozone to fresh air to be introduced into the cylinder 18 is provided in the intake passage 30 between the throttle valve 36 and the surge tank 33. For example, as illustrated in FIG. 4, the ozone generator 76 is provided to include a plurality of electrodes arranged in parallel to each other at a predetermined interval in either one of up-and-down directions and left-and-right directions in a cross section of an intake tube 301. The ozone generator 76 generates ozone by a silent discharge, using oxygen, which is contained in the intake air, as material gas. In other words, by applying a high-frequency alternating current high voltage from a power source (not illustrated) to the electrodes, silent discharge occurs in a spark gap and air passing therethrough (i.e., intake air) is ozonized. The intake air with ozone applied as above flows from the surge tank 33 to be introduced into each cylinder 18 via an intake manifold. By changing a mode of applying the voltage to the electrodes of the ozone generator 76 and/or changing the number of the electrodes to which the voltage is applied, an ozone concentration within the intake air after passing through the ozone generator 76 can be adjusted. As described later, a PCM 10 adjusts the ozone concentration within the intake air to be introduced into the cylinders 18, through such a control of the ozone generator 76.

The engine 1 with the configuration described as above is controlled by a powertrain control module 10 (hereinafter, may be referred to as the PCM). The PCM 10 is comprised of a microprocessor including a CPU, a memory, a counter timer group, an interface, and paths for connecting these units. The PCM 10 configures the controller.

As illustrated in FIGS. 1 and 2, detection signals of various kinds of sensors SW1 to SW16 are inputted to the PCM 10. The various kinds of sensors include the following sensors: an air flow sensor SW1 for detecting the flow rate of the fresh air and an intake air temperature sensor SW2 for detecting the temperature of the fresh air that are arranged on the downstream side of the air cleaner 31; a second intake air temperature sensor SW3, arranged on the downstream side of the intercooler/warmer 34, for detecting the temperature of the fresh air after passing through the intercooler/warmer 34; an EGR gas temperature sensor SW4, arranged near a connecting part of the EGR passage 50 with the intake passage 30, for detecting a temperature of external EGR gas; an intake port temperature sensor SW5, attached to the intake port 16, for detecting the temperature of the intake air immediately before flowing into the cylinder 18; an in-cylinder pressure sensor SW6, attached to the cylinder head 12, for detecting the pressure inside the cylinder 18; an exhaust gas temperature sensor SW7 and an exhaust gas pressure sensor SW8, arranged near a connecting part of the exhaust passage 40 with the EGR passage 50, for detecting the exhaust gas temperature and pressure, respectively; a linear $O_2$ sensor SW9, arranged on the upstream side of the direct catalyst 41, for detecting an oxygen concentration within the exhaust gas; a lambda $O_2$ sensor SW10, arranged between the direct catalyst 41 and the underfoot catalyst 42, for detecting the oxygen concentration within the exhaust gas; a fluid temperature sensor SW11 for detecting a temperature of the engine coolant; a crank angle sensor SW12 for detecting a rotational angle of the crankshaft 15; an accelerator position sensor SW13 for detecting an accelerator opening corresponding to an angle of an acceleration pedal (not illustrated) of the vehicle; an intake cam angle sensor SW14 and an exhaust cam angle sensor SW 15; and a fuel pressure sensor SW16, attached to the common rail 64 of the fuel supply system 62, for detecting the fuel pressure supplied to the injector 67.

By performing various kinds of operations based on these detection signals, the PCM 10 determines the state of the engine 1 and further the vehicle, and outputs control signals to the injectors 67, the ignition plugs 25, the VVT 72 and the VVL 74 on the intake side, the VVT 75 and the VVL 71 on the exhaust side, the fuel supply system 62, the actuators of the various kinds of valves (the throttle valve 36, the intercooler bypass valve 351, the EGR valve 511, and the EGR cooler bypass valve 531), and the ozone generator 76 according to the determined state. In this manner, the PCM 10 operates the engine 1.

Figure 6:
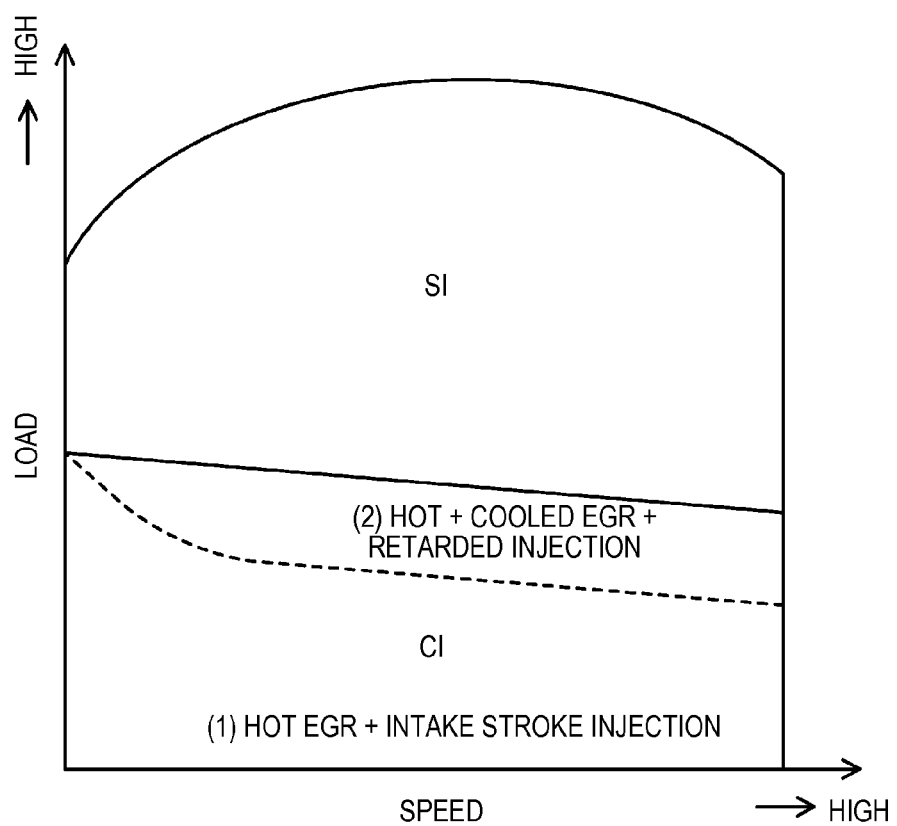
FIG. 6 is an illustration of an engine operation control map.

FIG. 6 illustrates one example of an operation control map of the engine 1. Within a low engine load range where the engine load is relatively low, the engine 1 performs compression-ignition combustion in which combustion is generated from a compression self-ignition without performing an ignition by the ignition plug 25, so as to improve fuel consumption and exhaust emission performance. However, with the compression-ignition combustion, the speed of the combustion becomes excessively rapid as the engine load increases, causing a problem of combustion noises, etc. Therefore, with the engine 1, within a high engine load range where the engine load is relatively high, the compression-ignition combustion is suspended and switched to a forced ignition combustion using the ignition plug 25 (here, spark-ignition combustion). As described above, the engine 1 is configured to switch a combustion mode according to the operating state of the engine 1, particularly according to the load of the engine 1, between a CI (Compression-Ignition) mode where the compression-ignition combustion is performed and an SI (Spark-Ignition) mode where the spark-ignition combustion is performed. Note that the boundary of switching the mode is not limited to the example in the illustration.

Figure 7A:
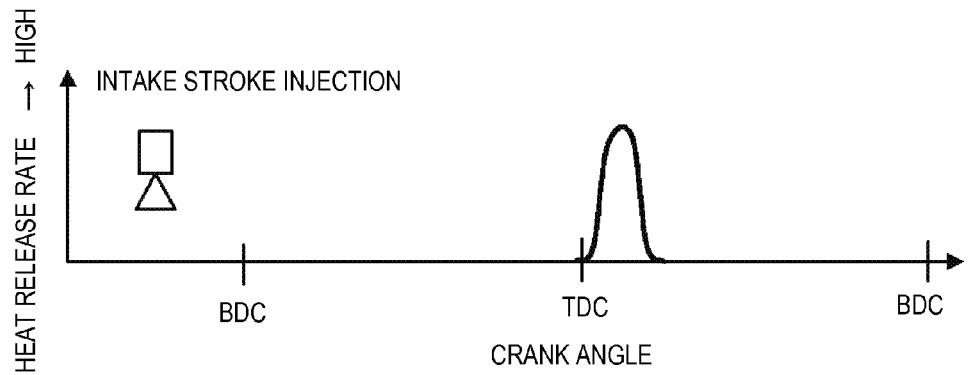
FIG. 7A illustrates one example of a fuel injection timing in a case where an intake stroke injection is performed in a CI mode and a heat release rate of CI combustion caused by the intake stroke injection.

The CI mode is divided into two ranges according to the level of the engine load. Specifically, within a range (1) corresponding to low and medium engine load ranges in the CI mode, hot EGR gas with a relatively high temperature is introduced into the cylinder 18 to improve ignitability and stability of the compression-ignition combustion. This, as described in detail later, is achieved by turning the VVL 71 on the exhaust side on and performing the exhaust open-twice control of opening the exhaust valve 22 during the intake stroke. The introduction of the hot EGR gas increases the compression-end temperature inside the cylinder 18, and is advantageous for improving the ignitability in the compression ignition and the combustion stability within the range (1). Moreover, within the range (1), as illustrated in FIG. 7A, the injector 67 injects the fuel into the cylinder 18 at least in a period from the intake stroke to a middle stage of the compression stroke, and thus homogeneous mixture gas is formed. The homogeneous mixture gas is compressed to self-ignite near the CTDC as illustrated in FIG. 7A.

Within a range (2) including the border for switching between the CI mode and the SI mode (i.e., switching load) and where the engine load is high in the CI mode, the temperature inside the cylinder 18 becomes high. Therefore, in order to suppress a pre-ignition, an amount of the hot EGR gas is reduced while introducing cooled EGR gas, which is cooled by passing through the EGR cooler 52, into the cylinder 18.

Figure 7B:
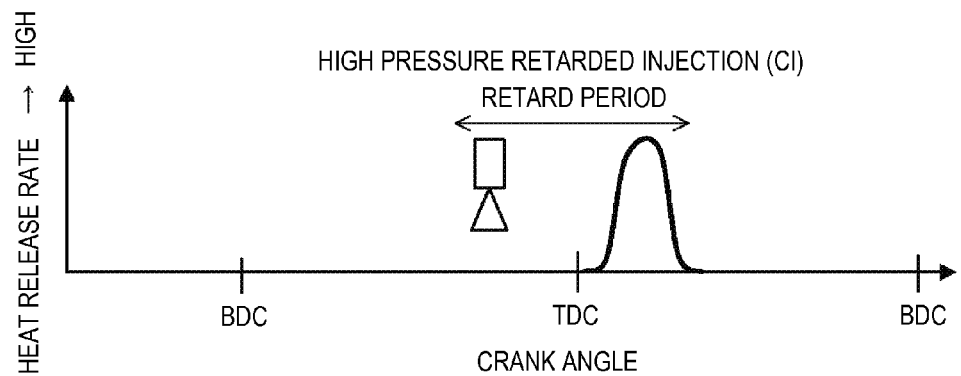
FIG. 7B illustrates one example of a fuel injection timing in a case where a high pressure retarded injection is performed in the CI mode and a heat release rate of the CI combustion caused by the high pressure retarded injection

Moreover, with the engine 1, the range of the CI mode is extended further to the high engine load side as much as possible by setting the switching load as high as possible, and thus, if the fuel is injected into the cylinder 18 in a period from the intake stroke to the middle stage of the compression stroke within the range (2) where the engine load is high in the CI mode, it may cause abnormal combustion (e.g., pre-ignition). On the other hand, if a large amount of cooled EGR gas with a low temperature is introduced to decrease the compression-end temperature inside the cylinder 18, then the ignitability of the compression-ignition will degrade. In other words, within the range (2), the compression-ignition combustion cannot be performed stably only by controlling the in-cylinder temperature. Therefore, within the range (2), by adjusting the fuel injection mode in addition to the in-cylinder temperature control, the compression-ignition combustion can be stabilized while avoiding abnormal combustion (e.g., pre-ignition). Specifically, in this fuel injection mode, as illustrated in FIG. 7B, the fuel is injected into the cylinder 18 at least in a period from a late stage of the compression stroke to an early stage of expansion stroke (hereinafter, referred to as the retard period) at a significantly higher fuel pressure compared to the conventional mode. Hereinafter, this characteristic fuel injection mode is referred to as the "high pressure retarded injection" or simply "retarded injection." By the high pressure retarded injection, the compression-ignition combustion can be stabilized while avoiding the abnormal combustion within the range (2). The details of the high pressure retarded injection will be described later.

While the CI mode is as described above, in the SI mode, although it is not clearly illustrated in FIG. 6, the VVL 71 on the exhaust side is turned off to suspend the introduction of the hot EGR gas but the introduction of the cooled EGR gas continues. Moreover, in the SI mode, as described in detail later, an opening of the EGR valve 511 is adjusted while the throttle valve 36 is fully opened, so as to adjust the amounts of fresh air and the external EGR gas introduced into the cylinder 18. The adjustment of the gas ratio introduced into the cylinder 18 as above can reduce a pumping loss, as well as it leads to avoiding abnormal combustion by introducing a large amount of the cooled EGR gas into the cylinder 18, and suppressing generation of Raw NOx and reducing a cooling loss by suppressing the combustion temperature in the spark-ignition combustion low. Note that within a full engine load range, the EGR valve 511 is fully closed to cancel the external EGR.

The geometric compression ratio of the engine 1 is, as described above, set to 15:1 or higher (e.g., 18:1). Since a high compression ratio increases the compression-end temperature and a compression-end pressure inside the cylinder, it is advantageous for stabilizing the compression-ignition combustion in the CI mode, especially within the low engine load range of the CI mode [e.g., the range (1)]. Whereas, in the SI mode corresponding to the high engine load range, such a high compression ratio causes a problem in engine 1 that abnormal combustion (e.g., pre-ignition and knocking) easily occurs.

Thus, with the engine 1, the high pressure retarded injection is performed in the SI mode to avoid abnormal combustion. Specifically, as illustrated in FIG. 7B, the high pressure retarded injection in which the fuel is injected into the cylinder 18 at a high fuel pressure of 30 MPa or higher in the retard period from the late stage of the compression stroke to the early stage of the expansion stroke is performed, and then the ignition is performed near the CTDC. Note that in the SI mode, in addition to the high pressure retarded injection in the retard period, part of the fuel to be injected may be injected into the cylinder 18 in an intake stroke period in which the intake valve 21 is open (i.e., split injections may be performed).

Here, to briefly explain about the high pressure retarded injection in the SI mode, for example, as disclosed in detail in JP2012-172665A which was made by the applicant of the present invention, the high pressure retarded injection shortens a reactable time length of the mixture gas which is from the start of the fuel injection until the end of combustion, and thus aims to avoid abnormal combustion. The reactable time length in this case is a total time length of a period in which the injector 67 injects the fuel ((1) an injection period), a period from the end of the injection until combustible mixture gas is formed around the ignition plug 25 ((2) a mixture gas forming period), and a period from the start of the combustion started by the ignition until the combustion ends ((3) a combustion period), in other words, (1)+(2)+(3). The high pressure retarded injection shortens each of the injection period and the mixture gas forming period by injecting the fuel into the cylinder 18 at a high pressure. The shortening of the injection period and the mixture gas forming period enables retarding of the fuel injection timing, more specifically the injection start timing, to be comparatively late; therefore, in the high pressure retarded injection, the fuel is injected in the retard period from the late stage of the compression stroke to the early stage of the expansion stroke.

Due to the injection of the fuel into the cylinder 18 at a high fuel pressure, turbulence within the cylinder becomes stronger and the turbulence energy within the cylinder 18 increases. With the combination of this increase and setting the fuel injection timing to the comparatively late timing, the combustion by the spark ignition can be started while keeping the high turbulence energy. This shortens the combustion period.

Thus, the high pressure retarded injection shortens each of the injection period, the mixture gas forming period, and the combustion period, and as a result, can significantly shorten the reactable time length of unburned mixture gas compared to the conventional fuel injection during the intake stroke. As a result of the shortened reactable time length, the progression of the reaction of the unburned mixture gas when the combustion ends is suppressed, and abnormal combustion can be avoided.

Here, by setting the fuel pressure to, for example, 30 MPa or higher, the combustion period can effectively be shortened. Moreover, the fuel pressure of 30 MPa or higher can also effectively shorten the injection period and the mixture gas forming period. Note that the fuel pressure may suitably be set according to a type of fuel used which at least contains gasoline. The upper limit value of the fuel pressure may be 120 MPa, etc.

The high pressure retarded injection avoids the occurrence of abnormal combustion in the SI mode by adjusting the mode of the fuel injection into the cylinder 18. Alternatively to such high pressure retarded injection, a conventionally known method for avoiding abnormal combustion is by retarding the ignition timing. While the retarded ignition timing causes degradation of the thermal efficiency and reduction of an engine torque, in the case of performing the high pressure retarded injection, since abnormal combustion is avoided by adjusting the mode of the fuel injection, the ignition timing can be advanced, and thus, the thermal efficiency can be improved and the torque can be increased. In other words, the high pressure retarded injection can not only avoid abnormal combustion, but also enable advancing of the ignition timing accordingly, and thereby, is advantageous for improving fuel consumption.

As described above, the high pressure retarded injection in the SI mode can shorten each of the injection period, the mixture gas forming period, and the combustion period, while the high pressure retarded injection performed within the range (2) of the CI mode can shorten the injection period and the mixture gas forming period. In other words, by injecting the fuel at the high fuel pressure into the cylinder 18 to increase the turbulence inside the cylinder 18, the atomized fuel is more finely mixed, and even when the fuel injection is performed at the late timing near the CTDC, the comparatively homogeneous mixture gas can swiftly be formed.

With the high pressure retarded injection in the CI mode, by injecting the fuel at the late timing near the CTDC within the comparatively high engine load range, the substantially homogeneous mixture gas is swiftly formed as described above while preventing pre-ignition in, for example, a compression stroke period in which the fuel is not injected into the cylinder 18 in the first place. Therefore, after the CTDC, the compression-ignition can surely be performed. Further, by performing the compression-ignition combustion in an expansion stroke period in which the pressure inside the cylinder 18 gradually decreases due to motoring, the combustion subsides, and an excessive increase in the pressure ($dP/d\theta$) inside the cylinder 18 due to the compression-ignition combustion can be avoided. Thus, a restriction due to noise, vibration, and harshness (NVH) is lifted and, as a result, CI mode applicable range is extended further to the high load range side.

Figure 8:
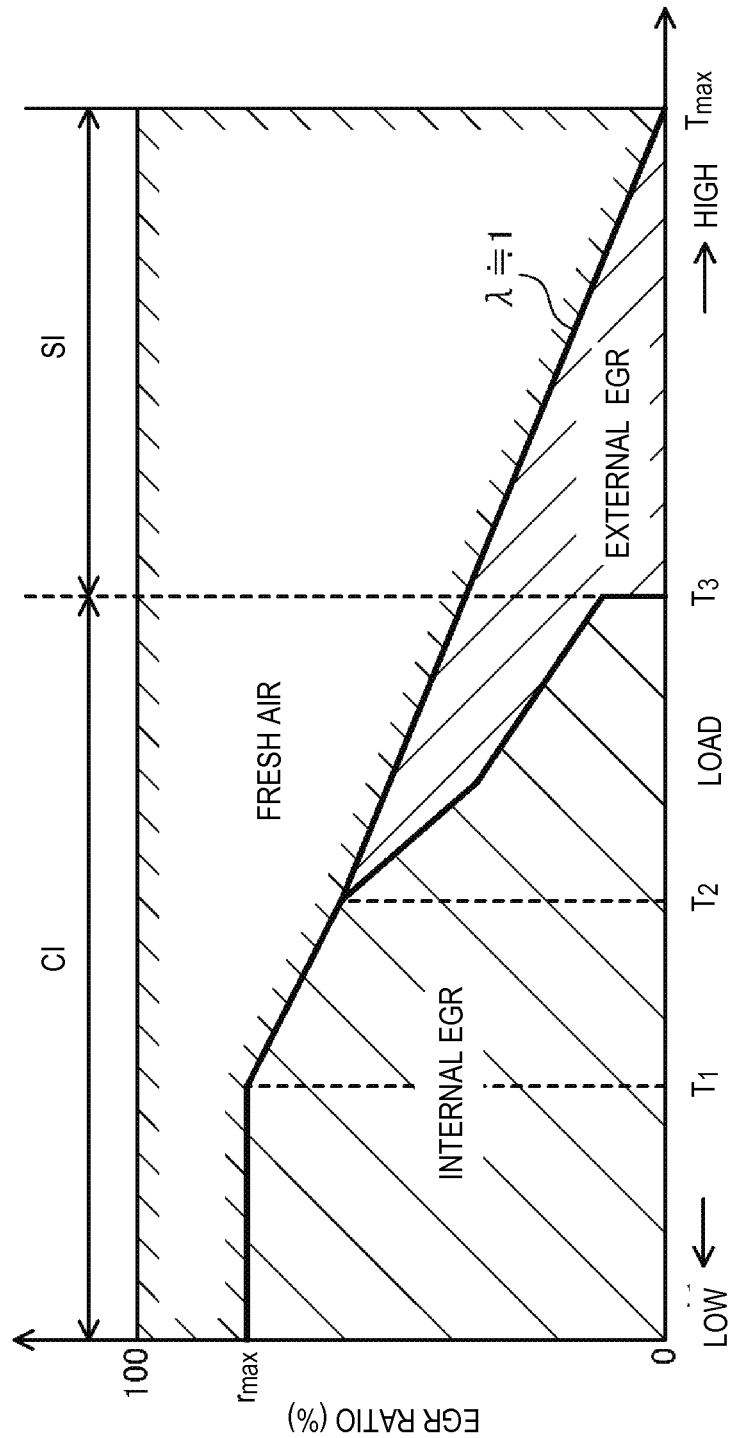
FIG. 8 is a chart illustrating a relationship between an EGR ratio and an engine load.

FIG. 8 illustrates a change in the EGR ratio with respect to the engine load (i.e., a change in gas composition within the cylinder 18). Hereinafter, the change in the EGR ratio is described in the order from the high engine load side to the low engine load side. (From Highest Load $T_{max}$ to Switching Load $T_3$)

The range where the engine load is higher than the switching load $T_3$ corresponds to the SI mode. Within this SI range, as described above, only the cooled EGR gas is introduced into the cylinder 18. Specifically, the opening of the throttle valve 36 is kept fully open, and the EGR valve 511 is fully closed at a full engine load but gradually opens as the engine load decreases. Thus, in the SI mode, the EGR ratio is set to the maximum value under a condition in which the air-fuel ratio of the mixture gas is set to the theoretical air-fuel ratio ($\lambda \approx 1$). This is advantageous for reducing the pumping loss. Moreover, setting the air-fuel ratio of the mixture gas to the theoretical air-fuel ratio allows a three-way catalyst to be used. Since the fuel injection amount is reduced as the engine load decreases, the EGR ratio becomes higher continuously. This leads to continuously changing the gas composition within the cylinder 18 when the engine load continuously changes, and thus, it is advantageous for improving the controllability. By increasing the EGR ratio as the engine load becomes lower, the EGR ratio is set to be close to the upper limit of EGR in the spark-ignition combustion in a low engine load part of the SI mode.

(From Switching Load $T_3$ to Specific Load $T_1$)

The switching load $T_3$ is related to the switching between the CI mode and the SI mode as described above, and the mode within the range where the engine load is lower than the switching load $T_3$ is the CI mode. The air-fuel ratio of the mixture gas is set to the theoretical air-fuel ratio ($\lambda \approx 1$) on both lower and higher engine load sides with respect to the switching load $T_3$ between the CI mode and the SI mode. Therefore, the EGR ratio increases continuously from the CI mode to the SI mode. In shifting between the CI mode and the SI mode where the combustion mode is switched, this does not cause any significant change other than switching between executing and not executing the spark ignition, and enables smoother switching between the CI mode and SI mode and suppression of the occurrence of torque shock and the like.

Moreover, within a range adjacent to the switching load $T_3$ on the low engine load side, continuously to the range adjacent to the switching load $T_3$ on the high engine load side, the compression-ignition combustion is performed by performing the high pressure retarded injection in which the fuel is injected at the high fuel pressure of 30 MPa or higher near the CTDC while introducing a comparatively large amount of EGR gas (cooled EGR gas) into the cylinder 18. This enables stable compression-ignition combustion to subside to lift the restriction of $dP/d\theta$, within a comparatively high engine load part of the range where the compression-ignition combustion is performed.

In the CI mode, the VVL 71 on the exhaust side is turned on to introduce the internal EGR gas (i.e., hot EGR gas) into the cylinder 18. Therefore, the on/off of the VVL 71 on the exhaust side is switched at the switching load $T_3$. The combined EGR ratio of the hot EGR gas and the cooled EGR gas becomes continuously higher as the engine load decreases. Moreover, the ratio between the cooled EGR gas and the hot EGR is changed such that the cooled EGR gas ratio becomes gradually lower and the hot EGR gas ratio becomes gradually higher as the engine load decreases. The introduction amount of the cooled EGR gas is adjusted by controlling the opening of the EGR valve 511. On the other hand, the introduction amount of the hot EGR gas is adjusted by controlling an overlapping amount of the open period of the intake valve 21 with respect to the open period of the exhaust valve 22 which opens in the intake stroke period. Specifically, the introduction amount of the hot EGR gas is adjusted by the combination of the adjustment of the open timing of the intake valve 21 and the close timing of the exhaust valve 22 by the VVT 72 on the intake side and the VVT 75 on the exhaust side, and the switch of the lift of the intake valve 21 between the large lift and the small lift.

Further, at a predetermined load $T_2$ between the switching load $T_3$ and a specific load $T_1$, the introduction of the cooled EGR gas is suspended, and when the engine load is lower than the predetermined load $T_2$, only the hot EGR gas is introduced into the cylinder 18. Thus, increasing the introduction amount of the hot EGR gas as the engine load becomes lower increases the gas temperature inside the cylinder before the compression stroke starts and thus increases the compression-end temperature. This is advantageous for improving the ignitability in the compression ignition within the range where the engine load is low, and for improving the stability of the compression-ignition combustion.

The EGR ratio which increases continuously as the engine load decreases is set to a highest EGR ratio $r_{max}$ at the specific load $T_1$.

(From Specific Load $T_1$ to Lowest Load)

To the specific load $T_1$, the EGR ratio is set continuously higher as the engine load decreases as described above; however, when the engine load is lower than the specific load $T_1$, regardless of the engine load, the EGR ratio is fixed to the highest EGR ratio $r_{max}$. Thus, the air-fuel ratio of the mixture gas is set lean.

Here, the EGR ratio is set to be lower than the highest EGR ratio $r_{max}$ because if the EGR ratio is increased and a large amount of exhaust gas is introduced into the cylinder 18, due to the specific heat ratio of gas within the cylinder 18 becoming low, the compression-end temperature becomes low even if the gas temperature before the compression stroke starts is high.

Specifically, exhaust gas generally contains a large amount of $CO_2$ and $H_2O$ which are triatomic molecules, and it has a high specific heat ratio compared to air containing nitrogen ($N_2$) and oxygen ($O_2$). Therefore, when the EGR ratio is increased and the exhaust gas introduced into the cylinder 18 is increased, the specific heat ratio within the cylinder 18 decreases.

The temperature of the exhaust gas is higher than that of fresh air, and therefore, the gas temperature before the compression stroke starts becomes higher as the EGR ratio becomes higher. However, since the specific heat ratio of gas becomes lower as the EGR ratio becomes higher, the gas temperature does not increase much even after the compression stroke starts, and as a result, the compression-end temperature reaches its peak at the predetermined EGR ratio $r_{max}$, and even if the EGR ratio is increased to be higher than that, the compression-end temperature only becomes lower.

Thus, with the engine 1, the EGR ratio is set to the highest EGR ratio $r_{max}$ at which the compression-end temperature reaches its peak. Further, when the engine load is lower than the specific load $T_1$, the EGR ratio is set to the highest EGR ratio $r_{max}$ to avoid the decrease in the compression-end temperature. The highest EGR ratio $r_{max}$ may be set to between 50% and 90%. The highest EGR ratio $r_{max}$ is set as high as possible within the extent that a high compression-end temperature can be secured, preferably between 70% and 90%. The geometric compression ratio of the engine 1 is set high as 15:1 or higher to secure a high compression-end temperature. Moreover, the exhaust open-twice control is adopted to introduce the exhaust gas with the temperature as high as possible, into the cylinder 18. Specifically, with the exhaust open-twice control, since the exhaust gas introduced into the cylinder 18 is discharged to the exhaust port once, as opposed to the configuration with the negative overlap period, the cooling loss caused by the compression of the exhaust gas is not increased, and also as opposed to the intake open-twice control of discharging the exhaust gas to the intake port where the temperature is relatively low, the decrease in the temperature of the exhaust gas can be suppressed. Therefore, the exhaust open-twice control can increase the gas temperature to its peak before the compression stroke starts. With the engine 1 configured to secure the highest possible compression-end temperature, the highest EGR ratio $r_{max}$ may be set, for example, about 80%. Setting the highest EGR ratio $r_{max}$ as high as possible is advantageous for reducing an unburned fuel loss of the engine 1. Specifically, since the unburned fuel loss easily becomes high when the engine load is low, setting the EGR ratio as high as possible when the engine load is lower than the specific load $T_1$ is extremely effective at improving the fuel consumption by reducing the unburned fuel loss.

Thus, with the engine 1, by securing the high compression-end temperature even when the engine load is lower than the specific load $T_1$, the ignitability in the compression-ignition combustion and the combustion stability are secured.

(Control Regarding Fuel Cut)

The engine 1 also performs, when predetermined fuel cut conditions are met while decelerating, a fuel cut control in which the fuel injection by the injector 67 is suspended. When resuming from the fuel cut thereafter, the operating state of the engine 1 is normally within the low engine load range where the compression-ignition combustion is performed and the engine 1 performs the compression-ignition combustion when resuming from the fuel cut. In this manner, degradations in exhaust emission performance and fuel consumption which become problems in performing the spark-ignition combustion when resuming from the fuel cut are avoided. In order to secure the stability of the compression-ignition combustion when resuming from the fuel cut, with the engine 1, a control for suppressing a temperature decrease inside the cylinder 18 during the fuel cut is performed. Next, the control relating to the fuel cut which is performed by the PCM 10 is described with reference to the flow illustrated in FIG. 9.

Figure 9:
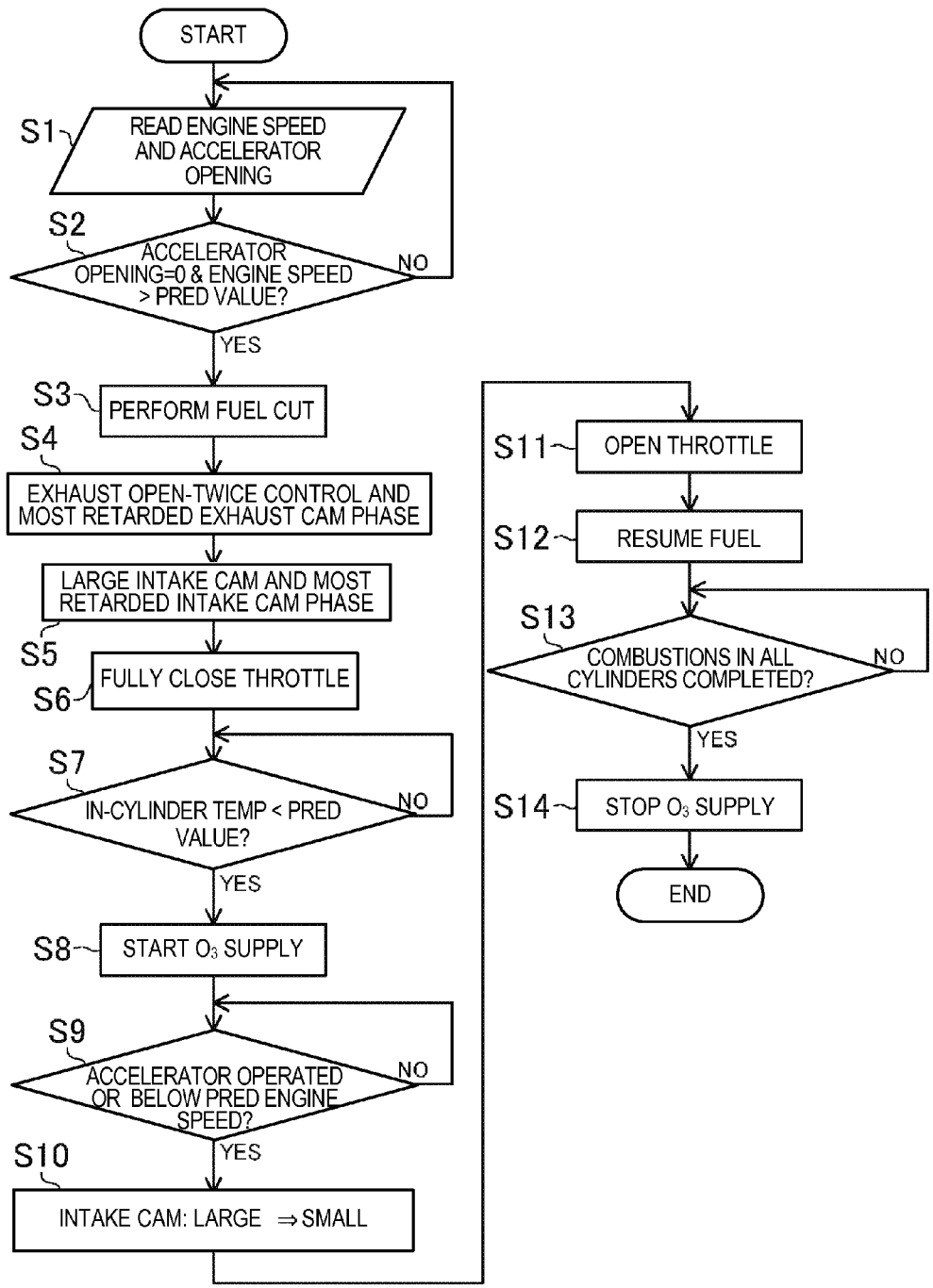
FIG. 9 is a flowchart of a control regarding a fuel cut, which is performed by a powertrain control module (PCM).

When the flow of FIG. 9 starts, at S1, the engine speed, the accelerator opening, and the like are read, and next, at S2, it is determined whether the accelerator opening is zero and the engine speed exceeds a predetermined value. The determination at S2 relates to a determination of the fuel cut conditions. If the result of the determination is negative, the fuel cut conditions are considered as not met, and the flow returns back to S1, whereas if the result of the determination is positive, the fuel cut conditions are considered as met, and the flow proceeds to S3.

At S3, the fuel cut in which the fuel injection by the injector 67 is suspended is performed, and next, at S4, the VVL 71 of the exhaust valve 22 is turned on to perform the exhaust open-twice control and the phase of the exhaust valve 22 is set to most retarded by the VVT 75. Thus, by performing the exhaust open-twice control during the fuel cut, the burned gas with a high temperature within the cylinder 18 before the fuel cut is kept within the cylinder 18 as much as possible and fresh air is suppressed from passing through the cylinder 18 from the intake side to the exhaust side. This suppresses the temperature decrease inside the cylinder 18.

At S5, the lift cam is switched to the large lift cam by the VVL 74 of the intake valve 21, and the phase of the intake valve 21 is set to most retarded by the VVT 72. Thus, the close timing of the intake valve 21 is set to be late, which is after an intake bottom dead center. Therefore, during the fuel cut, the amount of fresh air introduced into the cylinder 18 is reduced to suppress fresh air from passing through the cylinder 18 from the intake side to the exhaust side, and the effective compression ratio is reduced to decrease the compression-end temperature due to the motoring during the fuel cut. Thus, as described later, ozone introduced into the cylinder 18 is suppressed from evaporating.

At S6, the throttle valve 36 is fully closed. Thus, the amount of fresh air introduced into the cylinder 18 is reduced as much as possible. As a result, fresh air passing through the cylinder 18 from the intake side to the exhaust side is suppressed and the temperature decrease inside the cylinder 18 is suppressed.

Note that the procedures at S4, S5 and S6 are performed simultaneously or sequentially, and when they are performed sequentially, the order thereof may be switched.

Then, at S7, it is determined whether the temperature inside the cylinder 18 is lower than the predetermined value. The predetermined value may suitably be set to a temperature inside the cylinder 18 at which the compression-ignition combustion can be performed. If the temperature inside the cylinder 18 is higher than the predetermined value, S7 is repeated, and if the temperature inside the cylinder 18 is lower than the predetermined value, the flow proceeds to S8.

At S8, the ozone generator 76 is operated to start applying ozone to air inside the intake passage 30. As described above, since the introduction of fresh air into the cylinder 18 is suppressed by fully closing the throttle valve 36 and setting the intake valve 21 to operate with the large lift cam and to close late, the ozone concentration inside the intake passage 30 gradually becomes high.

At S9, it is determined whether a resume condition is met. Specifically, it is determined whether the accelerator is operated or the engine speed is below a predetermined speed. If the resume condition is not met, S9 is repeated. In other words, the fuel cut continues, and the supply of ozone inside the intake passage 30 also continues. Whereas, at S9, if the resume condition for supplying fuel is met due to the accelerator being operated or the engine load becoming lower than the predetermined speed, the flow proceeds to S10, where the cam of the intake valve 21 is switched from the large lift cam to the small lift cam by the VVL 74. Note that the exhaust valve 22 is still in the open-twice control mode. Then next, at S11, the throttle valve 36 is opened. Thus, a sufficient amount of fresh air is introduced into the cylinder 18; however, since the fresh air contains ozone, ozone is also introduced into the cylinder 18 along with the fresh air.

At S12, the fuel injection of the injector 67 is restarted. Since, as described above, the temperature decrease inside the cylinder 18 is suppressed during the fuel cut and ozone is introduced into the cylinder 18 when resuming from the fuel cut, the ignitability in the compression ignition is improved and the compression-ignition combustion can be performed stably.

Then, at S13, it is determined whether the combustion, in other words, the compression-ignition combustion, is performed once in each of all the cylinders 18 of the engine 1. If the combustions in all the cylinders are completed, since the stability of the compression-ignition combustion can be secured thereafter by introducing a larger amount of the internal EGR gas into the cylinder 18 through the exhaust open-twice control, the flow proceeds to S14, where the ozone generator 76 is stopped to stop the ozone supply. By swiftly stopping the ozone supply as described above, the power consumption is suppressed, which is advantageous for improving the fuel consumption.

Note that at S7, it may be determined whether a predetermined period of time has passed since the start of the fuel cut, instead of the determination described above. In this case, the temperature state inside the cylinder 18 is estimated based on a duration time of the fuel cut. Moreover, the determination at S7 may be performed based on both the temperature inside the cylinder 18 and the duration time of the fuel cut.

Moreover, at S7, if the resuming condition at S9 is met before the temperature inside the cylinder 18 becomes lower than the predetermined value, the fuel injection is restarted without the ozone supply. Since the state inside the cylinder 18 is kept at a comparatively high temperature, the compression-ignition combustion can be performed stably without introducing ozone into the cylinder 18.

Figure 10:
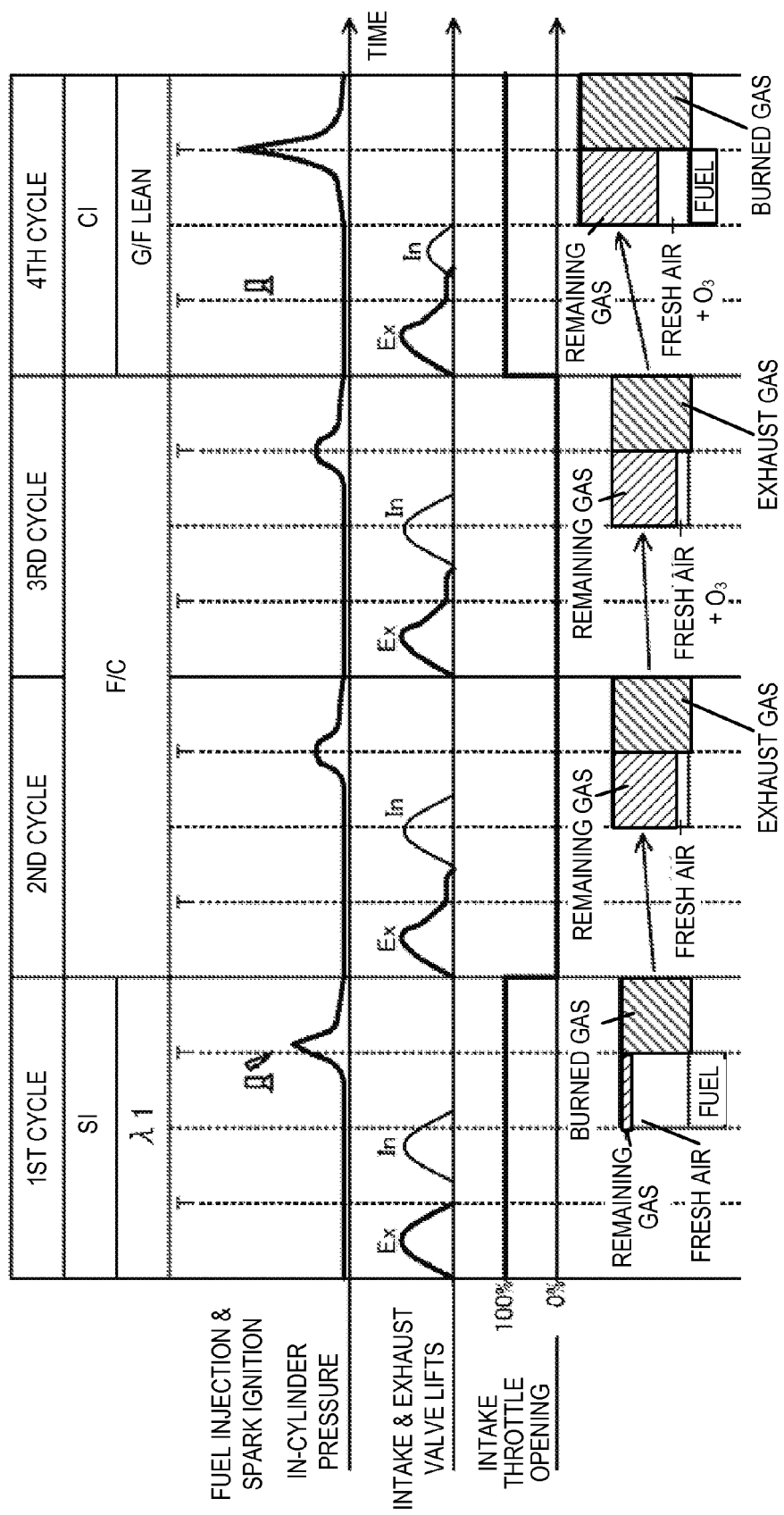
FIG. 10 is a time chart for describing the fuel cut and a control relating to resuming from the fuel cut.

FIG. 10 is a time chart for describing a control relating to the fuel cut performed according to the flow in FIG. 9. Specifically, FIG. 10 illustrates one example of changes caused in resuming from the fuel cut; changes in the fuel injection and the spark ignition, the change of the in-cylinder pressure, a change of the open state of the intake and exhaust valves, the change of the opening of the throttle valve, and the change of the gas state inside the cylinder. In FIG. 10, the crank angle progresses (i.e., time lapses) from left to right on the drawing.

First, the first cycle in FIG. 10 is in a state before the fuel cut, and the engine 1 is operated in the SI mode. Therefore, the injector 67 injects the fuel in the retard period and also the ignition plug 25 performs ignition near the CTDC. Since it is in the SI mode, the exhaust VVL 71 is turned off, and the exhaust valve 22 only opens on the exhaust stroke. Moreover, the intake valve 21 operates with the large lift cam and the phase thereof is set to a predetermined phase. The throttle valve 36 is fully opened.

The second cycle corresponds to the cycle after the fuel cut is started. As described above, the VVL 71 on the exhaust side is turned on, and the exhaust valve 22 opens on the exhaust stroke and the intake stroke. The phase of the exhaust valve 22 is retarded the most. Moreover, the intake valve 21 operates with the large lift cam and the phase thereof is set to retard the most. The throttle valve 36 is fully closed. Thus, the amount of fresh air introduced into the cylinder 18 is reduced as much as possible, and the remaining gas is increased as much as possible. Moreover, since the effective compression ratio is reduced, the compression-end pressure inside the cylinder 18 is also reduced.

The third cycle corresponds to the cycle during the fuel cut, where the ozone generator 76 starts to apply ozone. Thus, the fresh air introduced into the cylinder 18 includes ozone. Since it is during the fuel cut, the states of the exhaust and intake valves 22 and 21, and the throttle valve are the same as in the second cycle. Therefore, the effective compression ratio is comparatively low, and thus, even if ozone is introduced into the cylinder 18, the evaporation of ozone due to the high compression-end temperature can be suppressed.

The fourth cycle corresponds to the cycle of resuming from the fuel cut. When resuming, the cam of the intake valve 21 is switched to the small lift cam, and the throttle valve 36 is opened (here, it is set to be fully opened). The exhaust valve 22 is still in the open-twice control mode, and the close timing of the intake valve 21 is advanced. Therefore, the remaining gas and fresh air applied with ozone are introduced into the cylinder 18. Moreover, the injector 67 injects the fuel in a period from the intake stroke to the early stage of the compression stroke, and the homogeneous mixture gas ignites near the CTDC due to the comparatively high temperature environment inside the cylinder 18 and ozone, and the combustion is generated stably. Thus, resuming from the fuel cut can be performed in the compression-ignition combustion. As a result, the exhaust emission performance and the fuel consumption can be improved.

Note that the application of the art disclosed herein is not limited to the engine configuration described above. For example, the fuel injection in the intake stroke period may be performed into the intake port 16 by a port injector separately provided in the intake port 16, instead of the injector 67 provided in the cylinder 18.

Moreover, regarding the valve train system of the engine 1, a CVVL (Continuously Variable Valve Lift) for continuously changing the lift may be provided instead of the VVL 74 of the intake valve 21. In this case, the VVT 75 on the exhaust side may be omitted.

Moreover, the engine 1 is not limited to the in-line four cylinder engine described above, and may be applied to an in-line three cylinder engine, an in-line two cylinder engine, an in-line six cylinder engine, etc. Further, the engine 1 is applicable to various kinds of engines, such as a V6 engine, a V8 engine, and a flat-four engine.

Further, in the description above, the air-fuel ratio of the mixture gas is set to the theoretical air-fuel ratio ($\lambda \approx 1$) within the predetermined operating range; however, the air-fuel ratio of the mixture gas may be set lean. Note that setting the air-fuel ratio to the theoretical air-fuel ratio has an advantage that the three-way catalyst can be used.

The operation control map illustrated in FIG. 6 is merely an example, and other various maps may be provided.

Moreover, the high pressure retarded injection may be split injections as needed, and similarly, the intake stroke injection may also be split injections. In these split injections, the fuel may be injected in both the intake stroke and the compression stroke.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

DESCRIPTION OF REFERENCE CHARACTERS

1 Engine (Engine Body)
10 PCM (Controller)
18 Cylinder
21 Intake Valve
22 Exhaust Valve
30 Intake Passage
36 Throttle Valve
50 EGR passage (Exhaust Gas Circulation System)
51 Main Passage (Exhaust Gas Circulation System)
511 EGR Valve (Exhaust Gas Circulation System)
52 EGR Cooler (Exhaust Gas Circulation System)
67 Injector (Fuel Injection Valve)
71 VVL (Exhaust Valve Mechanism)
72 VVT (Intake Valve Mechanism)
74 VVL (Intake Valve Mechanism)
76 Ozone Generator (Ozone Introducer)

What is claimed is:

1. A control device of a compression-ignition engine, comprising:
    an engine having a cylinder;
    a fuel injection valve for injecting a fuel to be supplied into the cylinder;
    an exhaust valve mechanism for switching an operation mode of an exhaust valve of the engine between a normal mode in which the exhaust valve is opened on exhaust stroke, and a special mode in which the exhaust valve is opened so as to expand an opening of the exhaust valve on the exhaust stroke and intake stroke to introduce a part of exhaust gas into the cylinder;
    an intake valve mechanism configured to change a close timing and an open timing of an intake valve of the engine, the open timing being a timing at which the intake valve initiates opening from a completely closed configuration;
    a throttle valve disposed on an intake passage connecting with the cylinder; and
    a controller for operating the engine by compression-ignition combustion of mixture gas inside the cylinder at least when an operating state of the engine is within a low engine load range,
    wherein the controller suspends the fuel injection by the fuel injection valve when a predetermined fuel cut condition is met while the engine decelerates, and the controller fully closes the throttle valve and controls the exhaust valve mechanism to operate in the special mode during the fuel cut,
    wherein when a predetermined fuel resuming condition is met, the controller restarts the fuel injection by the fuel injection valve, opens the throttle valve, and causes the compression-ignition combustion of the mixture gas inside the cylinder, and
    wherein during the special mode, the controller sets the open timing of the intake valve during the intake stroke to coincide with a timing at which the exhaust valve finishes closing during the intake stroke, such that there is no negative overlap period when both of the intake and exhaust valves are closed during the exhaust stroke or the intake stroke.

2. The control device of claim 1, further comprising an ozone introducer for introducing ozone into the cylinder,
    wherein when restarting the fuel injection by the fuel injection valve, the controller introduces ozone into the cylinder by the ozone introducer.

3. The control device of claim 2, wherein when a temperature inside the cylinder becomes lower than a predetermined temperature during the fuel cut, the controller introduces ozone into the cylinder by the ozone introducer.

4. The control device of claim 2, wherein the ozone introducer is disposed on the intake passage and applies ozone to air in the intake passage, and
    wherein during the fuel cut, the controller starts applying ozone to air in the intake passage by the ozone introducer.

5. The control device of claim 4, wherein the controller sets a timing to start applying ozone by the ozone introducer based on at least one of a temperature inside the cylinder and a duration time of the fuel cut.

6. The control device of claim 2,
    wherein during the fuel cut, the controller sets the close timing of the intake valve to a late close timing that is after an intake bottom dead center by a predetermined crank angle so that an effective compression ratio decreases, and when the predetermined fuel resuming condition is met and the fuel injection by the fuel injection valve is restarted, the controller advances the close timing of the intake valve from the late close timing.

7. The control device of claim 3,
    wherein during the fuel cut, the controller sets the close timing of the intake valve to a late close timing that is after an intake bottom dead center by a predetermined crank angle so that an effective compression ratio decreases, and when the predetermined fuel resuming condition is met and the fuel injection by the fuel injection valve is restarted, the controller advances the close timing of the intake valve from the late close timing.

8. The control device of claim 4,
    wherein during the fuel cut, the controller sets the close timing of the intake valve to a late close timing that is after an intake bottom dead center by a predetermined crank angle so that an effective compression ratio decreases, and when the predetermined fuel resuming condition is met and the fuel injection by the fuel injection valve is restarted, the controller advances the close timing of the intake valve from the late close timing.

9. The control device of claim 5,
wherein during the fuel cut, the controller sets the close timing of the intake valve to a late close timing that is after an intake bottom dead center by a predetermined crank angle so that an effective compression ratio decreases, and when the predetermined fuel resuming condition is met and the fuel injection by the fuel injection valve is restarted, the controller advances the close timing of the intake valve from the late close timing.

10. The control device of claim 1, wherein a temperature inside the cylinder is at a gas temperature within the cylinder at a compression top dead center, and the temperature inside the cylinder is estimated based on at least a duration time of the fuel cut or directly by a sensor.

11. The control device of claim 5, wherein the temperature inside the cylinder is at a gas temperature within the cylinder at a compression top dead center, and the temperature inside the cylinder is estimated based on at least a duration time of the fuel cut or directly by a sensor.

12. The control device of claim 1,
wherein the controller controls the exhaust valve mechanism to operate in the open-twice mode, so that the exhaust valve is in a continuously opened state in the exhaust stroke and at least a part of the intake stroke, and during the intake stroke, the exhaust valve is opened at a constant, predetermined opening degree for a predetermined time period before the opening timing of the intake valve during the intake stroke.

13. A control device of a compression-ignition engine, comprising:
an engine having a cylinder;
a fuel injection valve for injecting a fuel to be supplied into the cylinder;
an exhaust valve mechanism for switching an operation mode of an exhaust valve of the engine between a normal mode in which the exhaust valve is opened on exhaust stroke, and a special mode in which the exhaust valve is opened so as to expand an opening of the exhaust valve on the exhaust stroke and intake stroke to introduce a part of exhaust gas into the cylinder;
a throttle valve disposed on an intake passage connecting with the cylinder;
an ozone introducer disposed on the intake passage and for applying ozone to air in the intake passage; and
a controller for operating the engine by compression-ignition combustion of mixture gas inside the cylinder at least when an operating state of the engine is within a low engine load range,
wherein, when a predetermined fuel cut condition is met while the engine decelerates, the controller suspends the fuel injection by the fuel injection valve, and during the fuel cut, the controller fully closes the throttle valve, controls the exhaust valve mechanism to operate in the special mode, and applies ozone to air in the intake passage by the ozone introducer.

* * * * *